US012568181B2

(12) United States Patent
Lang et al.

(10) Patent No.: US 12,568,181 B2
(45) Date of Patent: Mar. 3, 2026

(54) METHOD AND DEVICE OF VIDEO VIRTUAL BACKGROUND IMAGE PROCESSING AND COMPUTER APPARATUS

(71) Applicant: Lenovo (Beijing) Limited, Beijing (CN)

(72) Inventors: Bailing Lang, Beijing (CN); Tao Liu, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 671 days.

(21) Appl. No.: 17/944,003

(22) Filed: Sep. 13, 2022

(65) Prior Publication Data

US 2023/0132407 A1    May 4, 2023

(30) Foreign Application Priority Data

Oct. 28, 2021    (CN) .......................... 202111266447.X

(51) Int. Cl.
| | |
|---|---|
| *H04N 5/00* | (2011.01) |
| *G06T 7/20* | (2017.01) |
| *H04N 5/262* | (2006.01) |
| *H04N 5/272* | (2006.01) |
| *H04N 5/77* | (2006.01) |
| *H04N 23/63* | (2023.01) |

(52) U.S. Cl.
CPC .............. *H04N 5/272* (2013.01); *G06T 7/20* (2013.01); *H04N 5/2628* (2013.01); *H04N 5/77* (2013.01); *H04N 23/63* (2023.01); *G06T 2207/10016* (2013.01)

(58) Field of Classification Search
CPC ........ H04N 5/272; H04N 5/2628; H04N 5/77; H04N 23/63; H04N 5/2224; H04N 7/147; H04N 7/15; H04N 5/262; G06T 7/20; G06T 2207/10016
USPC ......................................................... 358/464
See application file for complete search history.

(56) References Cited

U.S. PATENT DOCUMENTS

| | | | | |
|---|---|---|---|---|
| 11,790,535 B2 * | 10/2023 | Gronau | ................... | G06T 7/194 |
| | | | | 382/173 |
| 11,800,056 B2 * | 10/2023 | Chu | ....................... | H04N 7/147 |

FOREIGN PATENT DOCUMENTS

CN        107707835 A        2/2018

* cited by examiner

*Primary Examiner* — Neil R McLean
(74) *Attorney, Agent, or Firm* — ANOVA LAW GROUP, PLLC

(57)        ABSTRACT

A video virtual background image processing method includes receiving a trigger instruction, obtaining a first video frame and a historical video frame neighboring to or apart at a certain number of frames from the first video frame, obtaining a movement parameter of a front view object in the first video frame relative to the historical video frame, and performing adjustment on a virtual background image displayed in a video interface according to the movement parameter.

17 Claims, 10 Drawing Sheets

Get close to image collection device

Get far away from image collection device

Get close to image collection device

Get far away from image collection device

Move toward right based on image collection device

Move toward left based on image collection device

Front view images combined after being separated from the first video frame an the historical video frame Remove the combined front view image from the video frame to obtain the real background image Combined front view image Remove the combined front view image from the video frame to obtain the real background image

METHOD AND DEVICE OF VIDEO VIRTUAL BACKGROUND IMAGE PROCESSING AND COMPUTER APPARATUS

CROSS-REFERENCE TO RELATED APPLICATION

This application claims priority to Chinese Patent Application No. 202111266447.X, filed on Oct. 28, 2021, the entire content of which is incorporated herein by reference.

TECHNICAL FIELD

The present disclosure relates to the image processing technology field and, more particularly, to a method and a device of video virtual background image processing and a computer apparatus.

BACKGROUND

With the development of artificial intelligence and multimedia technology, a multi-party video call is used in many settings such as office, education, and medical care. Due to the impact of the pandemic in recent years, application requirements for a multi-party online remote communication scenario in various fields increase rapidly. Thus, a video conference becomes an important tool.

In a video conference application process, in order to avoid leakage of the user personal privacy, the virtual background is used to replace the real environment background. However, in a focal adjustment process of a camera, a display state (e.g., zoom in/zoom out) of a front view object is changed. Thus, the front view object is separated from the virtual background after the focal adjustment, and an image displayed in a video conference interface is not natural, which diminishes user experience.

SUMMARY

Embodiments of the present disclosure provide a video virtual background image processing method. The method includes receiving a trigger instruction, obtaining a first video frame and a historical video frame neighboring to or apart at a certain number of frames from the first video frame, obtaining a movement parameter of a front view object in the first video frame relative to the historical video frame, and performing an adjustment on a virtual background image displayed in a video interface according to the movement parameter.

Embodiments of the present disclosure provide a video virtual background image processing device, including a memory and a processor. The memory stores a computer program. The processor is coupled with the memory and, when the program is executed by the processor, configured to receive a trigger instruction, obtain a first video frame and a historical video frame neighboring to or apart at a certain number of frames from the first video frame, obtain a movement parameter of a front view object in the first video frame relative to the historical video frame, and perform an adjustment on a virtual background image displayed in a video interface according to the movement parameter.

Embodiments of the present disclosure provide a non-transitory computer-readable storage medium. The storage medium stores a computer program that, when executed by a processor, causes the processor to receive a trigger instruction, obtain a first video frame and a historical video frame neighboring to or apart at a certain number of frames from the first video frame, obtain a movement parameter of a front view object in the first video frame relative to the historical video frame, and perform an adjustment on a virtual background image displayed in a video interface according to the movement parameter.

DETAILED DESCRIPTION OF THE EMBODIMENTS

For the description of the background technology, in order to enable a virtual background of video conference configuration to be adjusted synchronously with a display change of a captured front view object (such as a user). Thus, the front view object after focus and the virtual background can be more naturally integrated to make a user who is watching feel that the front view object is in the virtual background.

The present disclosure provides performing an analysis on several neighboring video frames that are captured to determine a mobile parameter of the front view object of a current video frame relative to a history video frame. For example, the user moves left and right, moves forward and backward, rotates, etc., relative to an image collection device. Since the environment where the user is located is often fixed, a relative position of the user in the fixed real background changes in a corresponding video frame that is captured. In order to improve an image effect displayed on a video interface, a video image of the frame needs to be adjusted to display the front view object in a middle area of the video interface. An image display state can be adjusted as needed, such as display brightness, blurred display, etc. In the present disclosure, the virtual background image displayed in the video interface is adjusted according to the mobile parameter of the front view object in the current video frame. Thus, the virtual background image and the front view object can be adjusted synchronously and ensure the image displayed in the output video interface is natural, which helps to improve efficiency of video conferences.

The technical solutions of embodiments of the present disclosure will be described in detail below with reference to the accompanying drawings of embodiments of the present disclosure. Apparently, the described embodiments are only some embodiments of the present disclosure, but not all the embodiments. Based on embodiments of the present disclosure, all other embodiments obtained by those of ordinary skill in the art without creative efforts shall be within the scope of the present disclosure.

Figure 1:
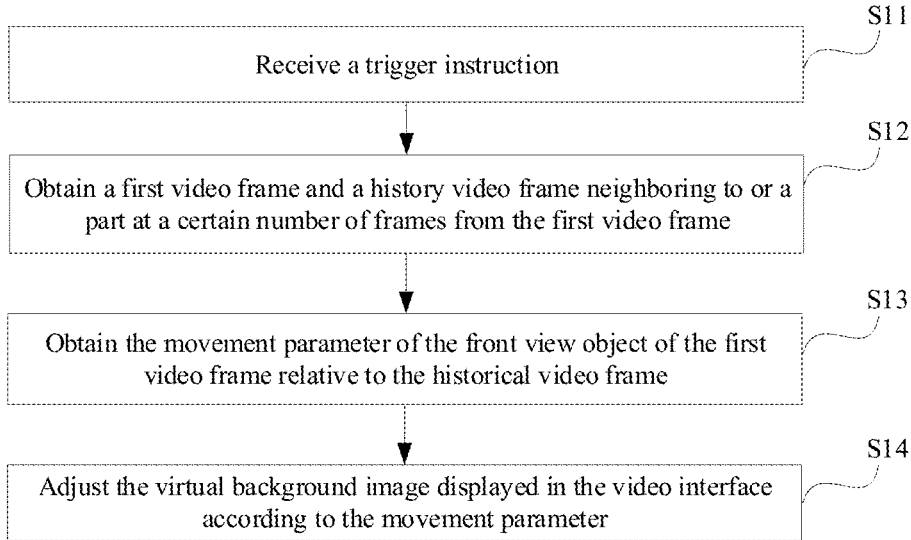
FIG. 1 illustrates a schematic flowchart of a video virtual background image processing method according to embodiments of the present disclosure.

FIG. 1 illustrates a schematic flowchart of a video virtual background image processing method according to embodiments of the present disclosure. The method may be executed by a computer apparatus such as a terminal or a server. The terminal may include but is not limited to a smartphone, a tablet, a wearable device, a laptop, a smartwatch, an augmented reality (AR) device, a virtual reality (VR) device, an on-vehicle device, a desktop, and another electronic device equipped with a display. The server can include a service device that provides a video communication service. As shown in FIG. 1, the video virtual background image processing method of embodiments of the present disclosure may include but is not limited to the following processes.

At S11, a trigger instruction is received.

In a video conference application scenario, if the user decides to participate in the video conference, an electronic device or an audio collection device communicatively connected to the electronic device and an image collection device may need to be turned on to collect an audio frame and a video frame, which may be sent to electronic devices participating in the video conference to be displayed synchronously. A communication control process of the video conference is not described in detail in the present disclosure.

For an electronic device participating in the video conference, if a trigger instruction for participating in the video conference is detected, a startup instruction for the audio collection device, the image collection device, and an application program with a video communication function may be generated. Therefore, the trigger instruction of embodiments of the present disclosure may include a video call instruction, which is used to instruct the image collection device to perform video image collection to obtain a corresponding video frame. The content of the trigger instruction and an acquisition method of the trigger instruction are not limited in the present disclosure.

In embodiments of the present disclosure, during the video conference, when a participant needs to use a virtual background to replace a real background in an environment where the participant is located, the video virtual background image processing method of the present disclosure may be triggered and executed to synchronously adjust the virtual background image and a participant image (i.e., the front view object captured in the video frame) to ensure the image displayed in the video interface to be natural. If the participant does not need to use the virtual background image, the collected video frame may be directly sent to electronic devices of other participants for output.

Therefore, in some embodiments, the trigger instruction in process S11 may represent a control instruction that triggers an execution of subsequent processing processes of the video virtual background image processing method of the present disclosure when the virtual background image is configured in the video interface. In some other embodiments, the trigger instruction may represent a control instruction that triggers the configuration of the virtual background image in the video interface. Thus, the subsequent processing processes of the video virtual background image processing method of the present disclosure may be automatically triggered.

In embodiments of the present disclosure, when the video virtual background image processing method of embodiments of the present disclosure is executed by a server, the trigger instruction may be sent by an electronic device participating in the video conference. When personal privacy needs to be protected, the electronic device may be configured to propose to use the virtual background image to replace the real background image in the environment where the video conference participant is located, respond to a trigger operation for realizing a privacy protection function of the video conference, generate a corresponding trigger instruction, and send the trigger instruction to the server. Thus, after receiving a video stream sent by the electronic device, the server may perform processing on video frames of the video stream according to the following method and send the video stream to other electronic devices participating in the video conference for output. Thus, the other participants in the video conference may see that the background image in the video interface where the video conference participant is located is the virtual background image. The electronic device may also ensure the virtual background image is fused with the video conference participant naturally.

The electronic devices participating in the video conference and a communication implementation process between servers that are used to improve the communication service of the video conference in the video conference are not described in detail in the present disclosure.

At S12, a first video frame and a history video frame neighboring to or a part at a certain number of frames from the first video frame are obtained.

Any video frame actually collected by the image collection device may be represented as the first video frame of the present disclosure. Since the video conference participant and the environment where the participant is located are captured, the first video frame may be a video frame of the obtained actual video stream, which may include an image of the front view object of the video conference participant and the real background image of the real environment where the front view object is located.

In connection with the above description of the technical solutions of the present disclosure, in order to understand the movement of the front view object at the current stage, the historical video frame captured by the image collection device for a past predetermined duration of the front view object may be analyzed and implemented. The value of the past predetermined duration is not limited by the present disclosure. The past predetermined duration may include the duration that takes to obtain a video frame. Thus, a previous video frame neighboring to the first video frame may be obtained. That is, the historical video frame neighboring to the first video frame may be obtained.

In some embodiments, the front view object such as the video conference participant may not move frequently during the process of participating in the video conference. Even if the front view object moves, a movement amplitude may be small. Since the collection time length of two neighboring video frames is small, the movement parameter of the front view object within the collection time length of the two neighboring frames may be very small. Error processing may easily occur. To improve processing reliability, the historical video frame apart at the certain number of frames from the first video frame may be obtained in embodiments of the present disclosure to assist to determine the movement parameter of the front view object in the first video frame. The certain number of frames that are apart is not limited by the present disclosure. In order to improve the output image effect of the video interface, the certain number of frames may not be too big. The historical video frame may include a historical video frame apart 1, 2, or 3 frames, which is not limited by the present disclosure.

In embodiments of the present disclosure, a content category included in the historical video frame may be the same as a content category included in the first video frame. That is, the historical video frame may also be the video frame collected by the image collection device at the corresponding time in the past. The historical video frame may include the front view object and the real background image of the front view object at the corresponding time. Therefore, the electronic device or the server may store the video frame obtained within the certain time length from the current time to obtain the first video frame. The historical video frame neighboring to or apart at the certain number of frames from the first video frame may be called according to the collection time length of the first video frame. The certain time length and a method for storing the historical video frame are not limited by the present disclosure.

At S13, the movement parameter of the front view object of the first video frame relative to the historical video frame is obtained.

At S14, the virtual background image displayed in the video interface is adjusted according to the movement parameter.

In connection with the above description of the technical solutions of the present disclosure, the virtual background image displayed in the video interface outputted by the electronic device may be expected to be adjusted synchronously as the front view object collected by the image collection device moves and changes. Thus, the adjusted virtual background image may be ensured to be fused with the front view object naturally and not be separated from the front view object. Therefore, the movement parameter of the front view object may be obtained by analyzing the change of the image content of the currently obtained first video frame relative to the historical video frame. The implementation method of process S13 of embodiments of the present disclosure is not limited.

In embodiments of the present disclosure, the movement parameter of the front view object may include, but is not limited to, a forward and backward movement parameter and/or a translation parameter, etc. The forward and backward movement parameter may represent a relative change in length or size of a first target reference of the front view object in the first video frame and the historical video frame. For example, the first target reference may include but is not limited to a pupil distance of the front view object (i.e., a pupil distance), a size of the mouth, the nose, or the entire head area, a distance between two ears, or the relative positional relationship between a plurality of target reference positions that are predetermined and fixed of the front view object, etc.

Figure 2:
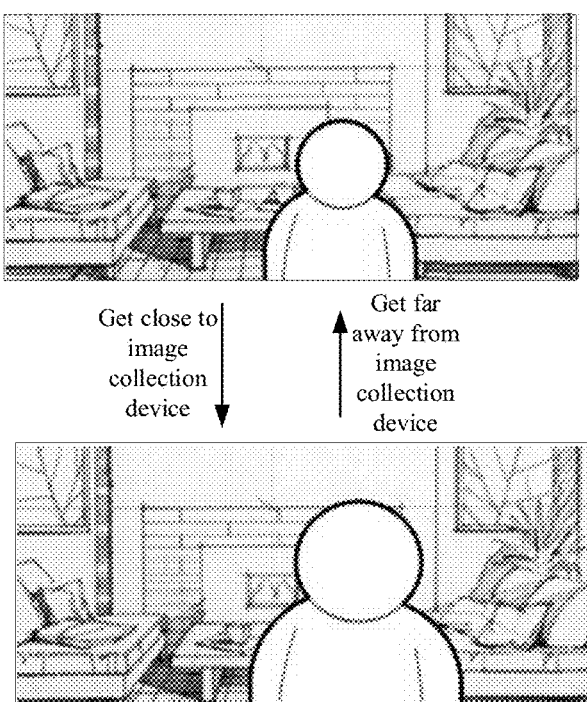
FIG. 2 illustrates a schematic diagram showing a change in a video frame content of a video virtual background image processing method according to embodiments of the present disclosure.

FIG. 2 illustrates a schematic diagram showing a change in a video frame content of a video virtual background image processing method according to embodiments of the present disclosure. In the process of the video conference, such as the process that the video conference participant gets close or far away, in order to cause the front view object and the virtual background image to be fused naturally, the length or the size of the first target reference may increase relatively as a photographing distance of the image collection device to the front view object increases. Zoom-in processing may be performed on the virtual background image displayed in the video interface according to a relative increment parameter. On the contrary, the length or the size of the first target reference may decrease as the photographing distance of the image collection device to the front view object decreases. Zoom-out processing may be performed on the virtual background image displayed in the video interface according to a relative decrease parameter. A method of realizing the scaling processing on the virtual background image is not limited by the present disclosure.

The translation parameter of the front view object may be used to represent a relative change in a position of a second target reference object on the front view object in the first video frame and in the historical video frame. The second target reference can be any one or more predetermined positions or predetermined areas on the front view object or the entire area of the front view object, etc. The content of the second target reference may be determined as needed, which is not limited by the present disclosure.

Figure 3:
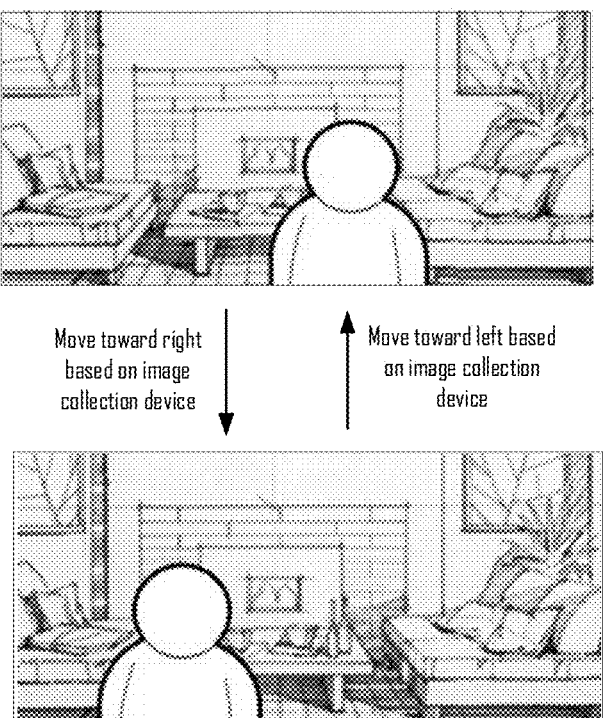
FIG. 3 illustrates a schematic diagram showing another change in a video frame content of a video virtual background image processing method according to embodiments of the present disclosure.

Based on this, when the video conference participant moves toward left or right relative to the image collection device, the relative position of the second target reference object on the video conference participant may change in corresponding continuously captured video frames. FIG. 3 illustrates a schematic diagram showing an application scenario of a real video stream. When the video conference participant moves toward left or right, the real background image may not change in the continuously captured video frames captured by the image collection device. However, the relative position of the video conference participant may change in the real background image. Thus, the translational movement of the video conference participant may be displayed in the environment. Moreover, translation adjustment may be performed on the virtual background image presented in the video interface, and the implementation process is not described in detail in the present disclosure.

In some other embodiments, the movement parameter obtained above may also include a rotation parameter, which can represent a relative change of an angle of the first target reference object in the first video frame and in the historical video frame. For example, the video conference participant may turn the body or the head. The rotation angle such as a pitch angle (pitch), a yaw angle (yaw), and/or a roll angle (roll) of the first target reference object may be obtained. The forward and backward movement parameter may be corrected according to the rotation angle. The virtual background image may be adjusted by using the corrected forward and backward movement parameter. The method of obtaining the rotation angle is not limited by the present disclosure.

The rotation angle of embodiments of the present disclosure may be calculated through mapping and conversion based on a three-dimensional vector determined by a xyz coordinate system and relative changes of a photographing angle of the image collection device and the length/size of the first target reference in the first video frame and the historical video frame. The implementation process is not described in detail by the present disclosure.

In some other embodiments of the present disclosure, for the first video frame and historical video frame, front view division processing may be performed on the collected video frame image based on an image division technology to obtain the front view image. That is, the first video frame may be a first front view image that is currently obtained. The historical video frame may be the second front view image obtained at the corresponding historical moment. Thus, after any video frame image in the real video stream is obtained, the front view division processing may be performed on the second front view image to obtain and store the front view image and the real background image, which can be called subsequently. The implementation process of the image division is not described in detail in the present disclosure.

The movement parameter of the first front view image relative to the second front view image can be obtained according to but is not limited to the method above. Thus, the virtual background image that replaces the first real background image can be adjusted. The implementation process is not described in detail in the present disclosure.

In embodiments of the present disclosure, in order to protect personal privacy, in the video conference scene displayed after the virtual background image is configured to replace the real background image in the real video stream, when the first video frame is obtained in the real video stream, the historical video frame neighboring to or apart at a certain number of frames from the first video frame can be retrieved. The movement parameter of the front view object in the first video frame relative to the historical video frame can be analyzed accordingly. Thus, the virtual background image displayed in the virtual interface may be adjusted synchronously according to the movement parameter. The fusion of the adjusted virtual background image and the front view object may be more natural, which may increase the user experience of using the virtual background image in the video conference.

Figure 4:
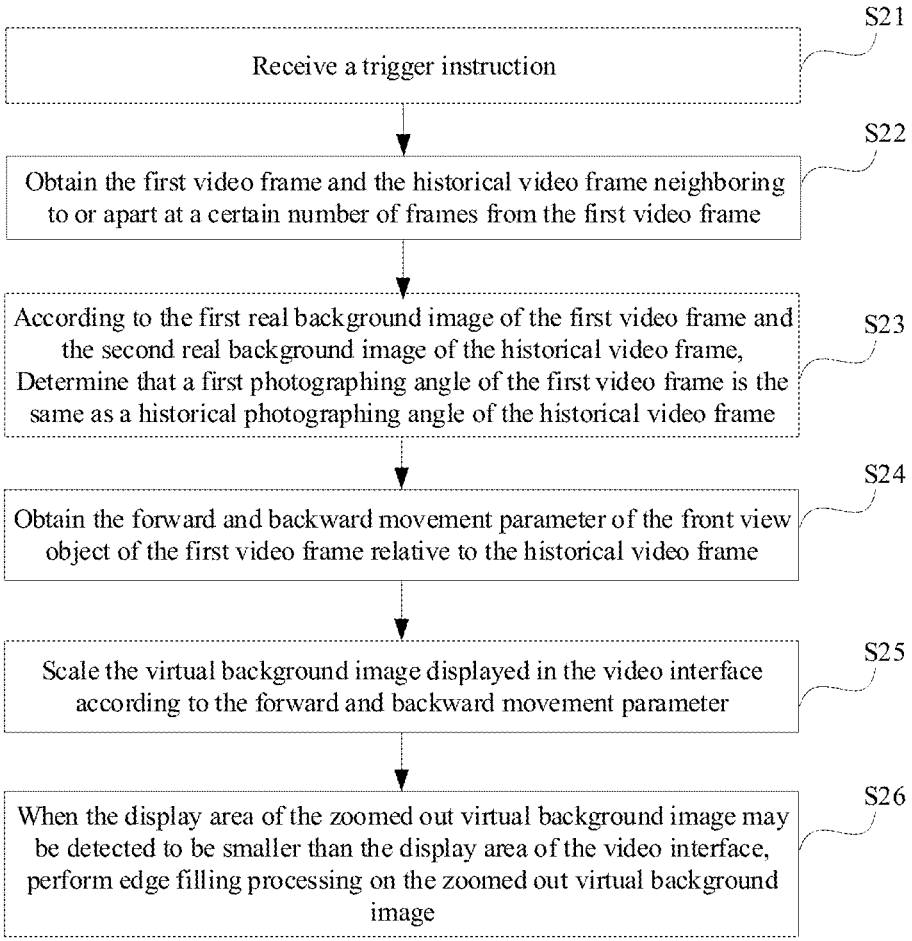
FIG. 4 illustrates a schematic flowchart of another video virtual background image processing method according to embodiments of the present disclosure.

FIG. 4 illustrates a schematic flowchart of another video virtual background image processing method according to embodiments of the present disclosure. Embodiments of the present disclosure provide a refined method with more detail of the video virtual background image processing method above. The present disclosure is not limited to the refined method. As shown in FIG. 4, the method includes the following processes.

At S21, a trigger instruction is received.

At S22, the first video frame and the historical video frame neighboring to or apart at a certain number of frames from the first video frame are obtained.

For the implementation processes of process S21 and process S22, reference may be made to, but is not limited to, the descriptions of the corresponding parts above, which are not repeated in embodiments of the present disclosure.

At S23, a first photographing angle of the first video frame is determined to be the same as a historical photographing angle of the historical video frame according to the first real background image of the first video frame and the second real background image of the historical video frame.

In embodiments of the present disclosure, the first video frame and the historical video frame may be video streams directly obtained by performing image collection through the image collection device, which may include the front view object and the background image of the environment where the front view object is located. In process S23, the first real background image may be an image obtained after a combined front view image is removed from the real image of the first video frame. The second real background image may be an image obtained after the combined front view image is removed from the real image of the second video frame. The combined front view image may be a combination of an image corresponding to the front view object in the first video frame and an image corresponding to the front view object in the historical video frame.

Since the front view object such as the video conference participant may move during the video conference, the relative position between the front view object and the environment background may change. Thus, the content in the background area in the captured video frame may be different. In the process of determining whether the photographing angle at the corresponding moment changes, in order to avoid the interference of the determination result by the front view object movement, image areas corresponding to the front view objects of the first video frame and the historical video frame may be eliminated. That is, for each video frame of the first video frame and the historical video frame, the image area obtained by combining the front view images of the first video frame and the historical video frame can be deleted.

Figure 5:
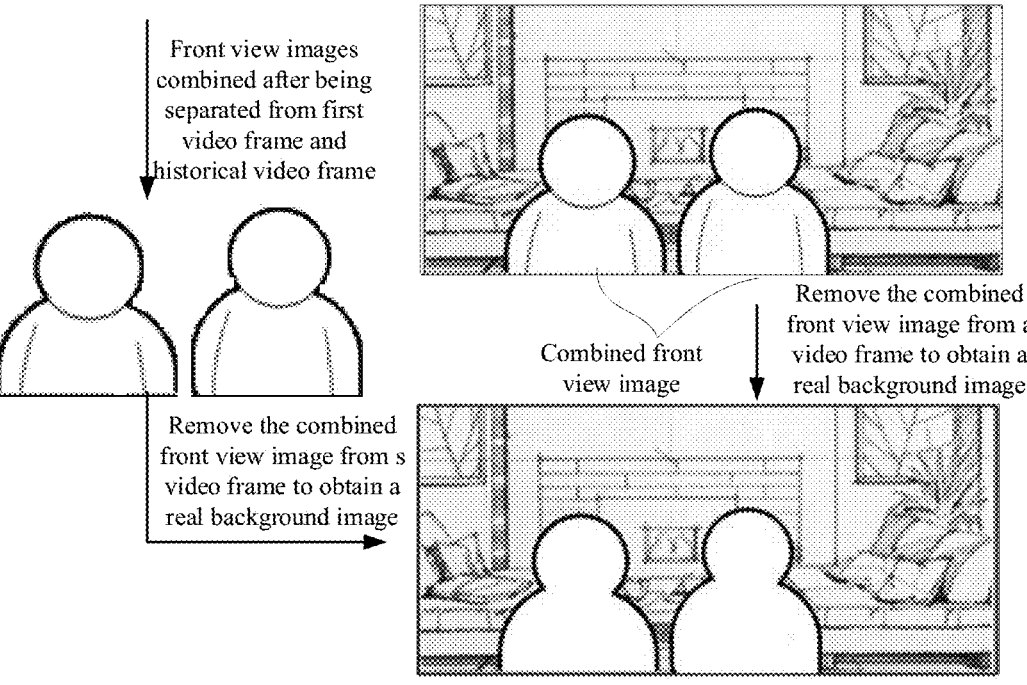
FIG. 5 illustrates a schematic diagram showing acquisition of a real background image of a video virtual background image processing method according to embodiments of the present disclosure.
Figure 6:
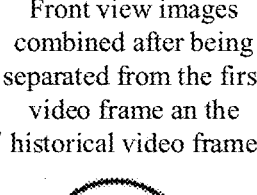
FIG. 6 illustrates a schematic diagram showing acquisition of another real background image of a video virtual background image processing method according to embodiments of the present disclosure.
Figure 6:
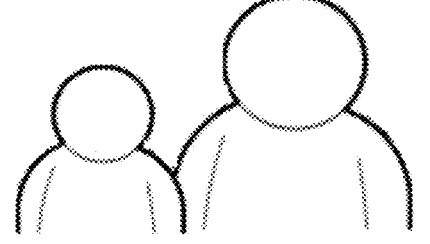
Figure 6:
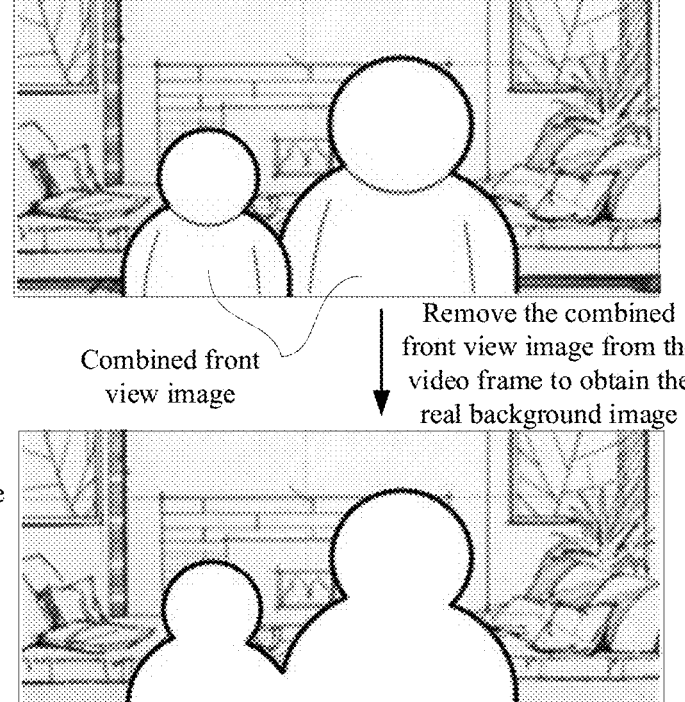

Taking the application scenarios shown in FIG. 2 and FIG. 3 as examples, and referring to the schematic diagrams of image processing shown in FIG. 5 and FIG. 6, the front view image of the first video frame and the front view image of the historical video frame can be combined. That is, the two front view images can be arranged in the same background image of the two video frames according to relative position information of the two front view images, for example, the combined front view image shown at upper boarder on the right side in FIG. 5 or FIG. 6. Then, the combined front view image area may be deleted from the two video frames to obtain the real background image shown at the bottom boarder on the right side in FIG. 5 or FIG. 6 to eliminate the interference of the determination by the user movement.

In some embodiments, as shown in the drawing on the left side of FIG. 5 or FIG. 6, in order to obtain the first real background image and second real background image, the front view division processing may be performed on the first video frame and the historical video frame to obtain the corresponding first front view image and second front view image and the relative position information of the front view images in the corresponding video frame images. Then, the first front view image and the second front view image can be combined according to the relative position information to obtain the combined front view image and a combined position relationship in a display area of the video frame. Thus, the combined front view image may be deleted from the first video frame according to the combined position relationship to obtain the first real background image. The combined front view image may be deleted from the historical video frame to obtain the second real background image.

In some other embodiments, the front view division processing may be performed on the first video frame and the historical video frame according to the method above. After the front view area and the background area are determined, the first video frame and the historical video frame may be compared in the present disclosure to determine the second front view area of the second front view image in the historical video frame in the first video frame and the first front view area of the first front view image of the first video frame in the historical video frame. Then, the first front view image and the second front view area may be deleted from the first video frame to obtain the first real background image. Similarly, the second front view image and the first front view area may be deleted from the historical video frame to obtain the second real background image.

In some embodiments, the first real background image may be an image captured from an edge area of a real image of the first video frame. For example, the first real background image may be obtained by intercepting an image with a certain width along the upper edge and the left and right edges of the real image of the first video frame. The second real background image may be an image intercepted from an edge area of the real image of the second video frame. For example, the second real background image may be obtained by intercepting an image with a certain width along the upper edge and the left and right edges of the real image of the second video frame.

The acquisition method of the first real background image and the second real background image may include but are not limited to the implementation manners above. A new acquisition method can be obtained by performing adaptive adjustment according to the technical concept above, which are not described in detail in the present disclosure.

Based on the description of the acquisition method of the first real background image and the second real background image, in embodiments of the present disclosure, whether the first photographing angle of the first video frame and the historical photographing angle of the historical video frame change may be determined by comparing whether the two real background images are the same. That is, if the two real background images are determined to be the same, compared to the historical video frame, the photographing angle of the image collection device may not change when the first video frame is obtained. Then, whether the front view object moves may be further determined to obtain a corresponding movement parameter to synchronously adjust the virtual background image.

According to the above analysis method, when the first real background image and the second real background image are determined to be different, the photographing angle of the image collection device may change when the first video frame is obtained. That is, the photographing direction of the image collection may change at the current moment relative to the previous moment. Thus, the image processing may continue to be performed on a next video frame obtained according to the method above, and the virtual background image may not need to be adjusted.

In some other embodiments, in order to improve the processing reliability and accuracy of the virtual background image displayed in the video interface, according to the comparison method above, when the first real background image and the second real background image are determined to be different, whether the real background of the first video frame compared to the historical video frame changes may be more accurately detected further in connection with another detection manner in the present disclosure. That is, whether the first photographing angle of the first video frame compared to the historical photographing angle of the historical video frame changes may be more accurately determined. In some embodiments of the present disclosure, the detection of the change of the photographing angle may not limited to an optical flow included in the computer vision technology.

The optical flow may include determining a correspondence a previous frame and a current frame by using changes of pixels of an image series in a time domain and a correspondence between neighboring frames and calculating movement information of the object of the neighboring frames. In the present disclosure, the implementation process of determining whether the first real background image of the first video frame and the second real background image of the historical video frame are same based on the matched optical flow (e.g., based on a feature or an area) is not described in detail and can be determined according to the calculation principle of the optical flow.

In some embodiments of the present disclosure, a video background recognition model configured to determine whether real background images of a plurality of video frames are the same may be pre-trained based on an image division algorithm and an optical flow algorithm of the computer vision. Thus, the video background recognition model may include functions of front view division and background image comparison. In the present disclosure, the training and implementation processes of the video background recognition model are not described in detail. Based on this, after the first video frame and the historical video frame are obtained in the present disclosure, the two video frames can be input into the pre-trained video background recognition model. A recognition result of whether the photographing angles of the two video frames are the same may be outputted. The implementation process is not described in detail in the present disclosure.

At S24, the forward and backward movement parameter of the front view object of the first video frame relative to the historical video frame is obtained.

When the photographing angle of the first video frame does not change compared to the photographing angle of the historical video frame, process S24 may be performed according to but is not limited to the method above. The implementation process is not repeated in embodiments of the present disclosure. According to the above analysis, the movement parameter of the front view object may include but is not limited to the forward and backward movement parameter, the translation parameter, and/or the rotation parameter, etc. The content of the movement parameter obtained this time may be determined according to an actual situation. Different types of movement parameters may be obtained in different acquisition methods. The acquisition methods of different types of movement parameters are not limited in the present disclosure.

In connection with the above description related to the movement parameter, the application scenario of the user participating in the video conference may be taken as an example for description. In connection with FIG. 2, the user moves forward and backward in front of the image collection device. When the photographing direction of the image collection device does not change, the image contents of the two neighboring video frames after the combined human images are removed may be determined to be the same according to the detection method. The forward and backward movement parameter may be determined by calculating an interpupillary distance of the user in the two video frames. The interpupillary distance may be merely an example of the first target reference, which is not limited in the present disclosure. The detection method for the length or size change of another first target reference may be similar and may not be described in detail in the present disclosure.

At S25, the virtual background image displayed in the video interface is scaled according to the forward and backward movement parameter.

After the forward and backward movement parameter is obtained according to the method described above, the scaling processing may be performed synchronously on the virtual background image according to the method of process S25, such as equal-scale scaling. The scaling processing method is not limited in the present disclosure.

Figure 7:
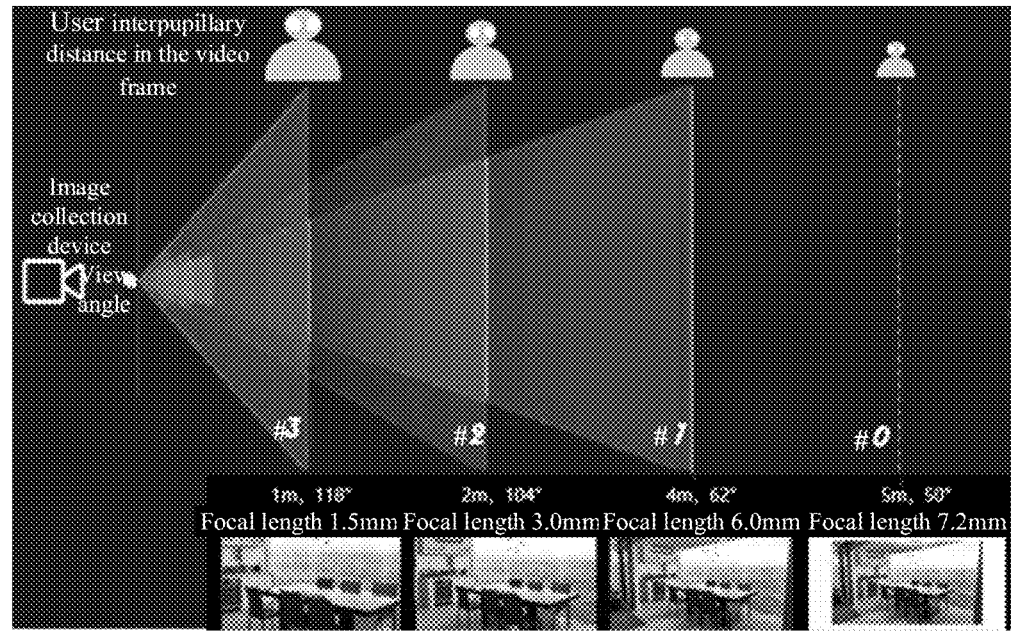
FIG. 7 illustrates a schematic diagram showing a correspondence between an interpupillary distance change and a zoom ratio of a virtual background image in a video virtual background image processing method according to embodiments of the present disclosure.

In some embodiments, referring to but not limited to FIG. 7, the first target reference object may be the pupils of the two eyes of the user. The corresponding user interpupillary distance and the virtual background image after the scaling processing may be pre-determined when the image collection device is arranged with different focal lengths. That is, a correspondence between the change of the user interpupillary distance and the scaling ratio of the virtual background image may be determined. As such, in practical applications, after the change of the user interpupillary distance of the first video frame compared to the user interpupillary distance of the second video frame is determined, the pre-determined correspondence may be retrieved to determine the scaling ratio of the virtual background image. Thus, the scaling processing may be performed on the virtual background image output in the video interface according to the scaling ratio.

For other types of first target references and other forms of correspondences, the implementation processes of the virtual background image scaling processing are similar are not described in detail in the present disclosure.

When the user moves forward and backward during the video conference, the scaling processing may be performed on the virtual background image output in the video interface corresponding to the user synchronously. Thus, the virtual background image in the video interface output by the electronic device and the user image may change synchronously. As such, when the user sets the virtual background image to protect personal privacy, an automatic focusing function of the image collection device may be started, which can ensure that the virtual background is integrated and scaled with the user image. A separated display effect that the user image floats in front the virtual background may not occur.

In some other embodiments, when the scaling processing is performed on the virtual background image, the display brightness of the front view object displayed in the video interface according to the forward and backward movement parameter may be adjusted in the present disclosure to meet a user image display requirement for the video interface. Thus, when the user face is close to the image collection device, the display brightness of the face area displayed in the video interface may be increased. On the contrary, when the face is far away from the image collection device, the display brightness of the face area displayed in the video interface can be reduced to improve the user experience.

In some other embodiments, in connection with the video virtual background image processing methods described above, the method may further include performing blurring processing on the virtual background image displayed in the video interface according to the forward and backward movement parameter. Thus, before the scaling processing is performed on the virtual background image, a background blurring processing request may be responded to. After the blurring processing is performed on the virtual background image, the scaling processing may be performed on the virtual background image after the blurring processing, which ensures that the virtual background image can be scaled and blurred with the user image. Thus, the overall image output in the video interface may be more natural.

The user may turn his head during the forward and backward movement. Thus, the pupillary distance at the same photographing distance may change. Therefore, in practical applications, not only the focal length of the image collection device may affect the pupillary distance. Moreover, an angle change of the head towards the image collection device, that is, the change of the rotation angle, will also affect the pupillary distance. For example, the rotation changes of any one or more angle dimensions of Roll, Yaw, and Pitch.

Figure 8:
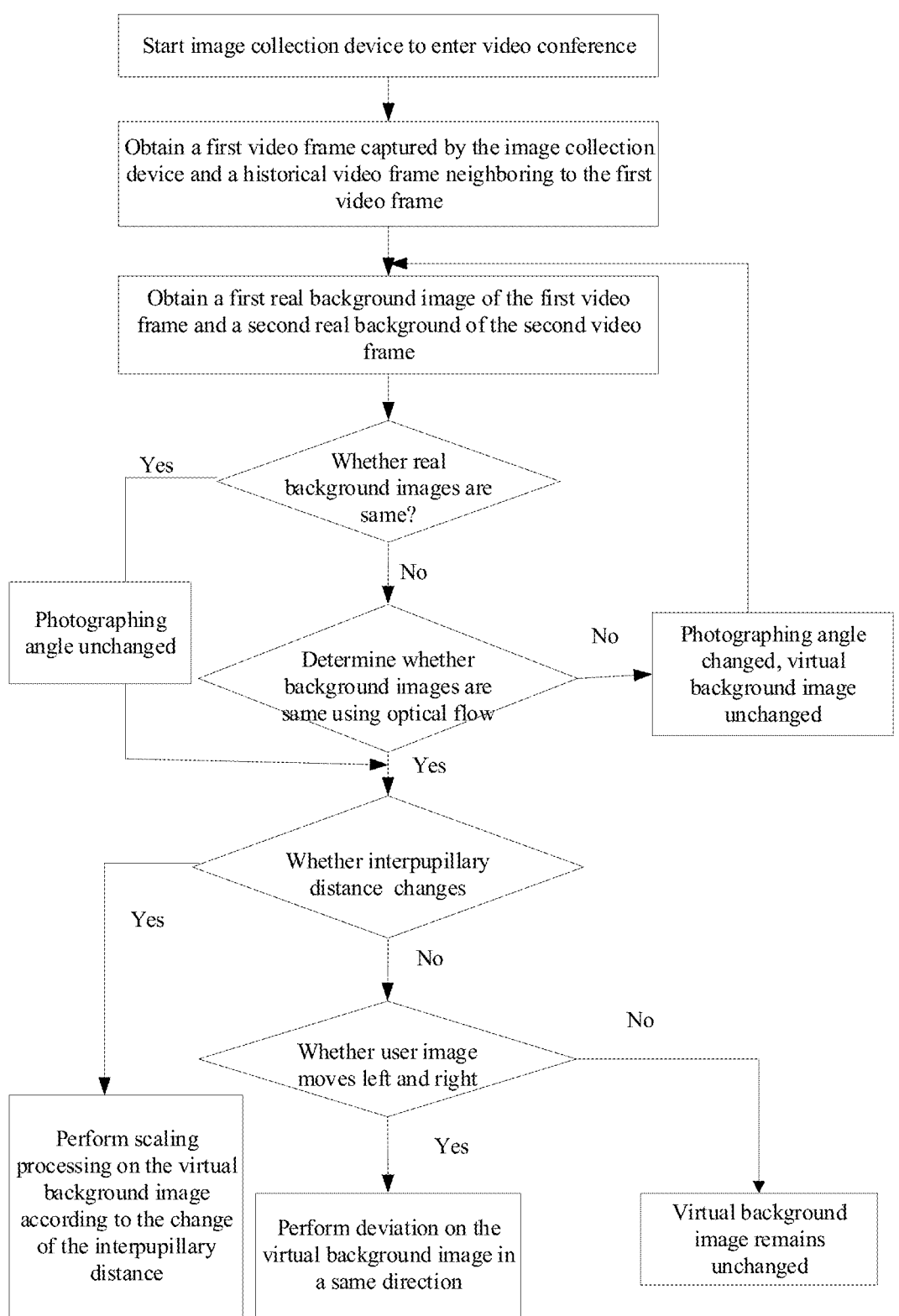
FIG. 8 illustrates a schematic flowchart of another video virtual background image processing method according to embodiments of the present disclosure.

Therefore, in some other embodiments, as shown in FIG. 8, the change of the face angle, that is, the rotation angle, may be obtained according to the method above. The correction processing may be performed on the forward and backward movement parameter according to the rotation angle. In some embodiments, the forward and backward movement parameter in process S25 may be the corrected forward and backward movement parameter. The subsequent implementation processes may be similar and are not described in detail in the present disclosure. For example, according to the processing method described above, the scaling processing may be performed by detecting the interpupillary distance and the change of the face angle (i.e., the rotation angle of the first target reference) to obtain the interpupillary distance of the front face effect. If the interpupillary distance does not change, the scaling processing may not need to be performed on the virtual background. If the interpupillary distance changes, the scaling processing may be performed according to the method above.

At S26, when the display area of the zoomed-out virtual background image may be detected to be smaller than the display area of the video interface, edge filling processing is performed on the zoomed-out virtual background image.

In the process of zooming out the virtual background image, if a zoomed-out ratio is large, the display area of the zoomed-out virtual background image may be smaller than the display area of the video interface, for example, the scaling ratio corresponding to focal length #0 in FIG. 7. If the zoomed-out virtual background image is directly output, the zoomed-out virtual background image may be displayed in the middle area of the display area of the video interface. A surrounding display area of the zoomed-out virtual background image may be blank. That is, the zoomed-out virtual background image cannot fully fill the display area of the video interface. Thus, to improve the display effect, effect filling may be performed on the zoomed-out virtual background image. The implementation method is not limited to the present disclosure. Thus, the display area of the virtual background image after the edge filling processing may be the same as the display area of the video interface. That is, the virtual background image after the edge filling processing may fully fill the video interface.

In connection with the above analysis, during the video conference, the photographing angle of the image collection device may not change. However, the user may move the left and right of the image collection device. In connection with FIG. 3 and FIG. 8, when the user interpupillary distance of the first video frame is determined to be unchanged compared to the user interpupillary distance of the historical video frame, the translation parameter of the front view object in the first video frame may be obtained relative to the historical video frame. Thus, a translational adjustment may be performed on the virtual background image displayed in the video interface, e.g., the translation adjustment in a same direction and an equal distance. The implementation method is not limited to the present disclosure.

For example, the first target reference may be further taken as the pupil, and the second target reference may be taken as the user image area. As shown in FIG. 8, when the interpupillary distance is determined to be unchanged, the first relative position information of the first front view image in the first video frame is compared to the second relative position information of the second front view image of the historical video frame to obtain the translation parameter, that is, a left and right deviation amount of the front view object in the first video frame compared to the front view object in the historical video frame. Then, same direction deviation adjustment may be performed on the virtual background image displayed in the video interface according to the left and right deviation amount.

In some other embodiments, the combination of the image (i.e., the first front view image) corresponding to the front view object in the first video frame and the image (i.e., the second front view image) corresponding to the front view object in the historical video frame may be directly obtained, that is the combined front view image. Then, the relative position relationship between the middle positions of the two front view objects included in the combined front view image may be obtained. The relative position relationship may include a center distance and a relative direction, which may be used as the translation parameter. Thus, the translation adjustment may be performed on the virtual background image. That is, the virtual background image may be moved along the relative direction for the center distance relative to the video interface. The implementation method of performing the translation adjustment on the virtual background image displayed in the video interface according to the translation parameter is not limited and include but is not limited to the methods above.

The methods above may be used in the present disclosure to track a coordinate change of a contour of the human face (i.e., the second target reference). When the human face moves to the left, the virtual background image displayed in the video interface may follow to move to the left. When the human face moves to the right, the virtual background image displayed in the video interface may follow to move to the right to improve the user experience.

In some other embodiments, during the video conference, the user may move in a forward and backward direction to have a movement distance and in a translational direction to have a translational movement distance. For example, the image collection device may have a certain angular movement. Thus, according to the method above, the forward and backward movement parameter and the translational parameter may be obtained in the present disclosure. The rotation angle may also be obtained. Then, according to the method above, the scaling processing may be performed on the virtual background image displayed in the video interface, and then the translation adjustment processing may be performed on the virtual background image. The implementation process is not repeated in embodiments of the present disclosure.

In some other embodiments of the present disclosure, during the video conference, the user may not move. However, the image collection device may move, such as the photographing angle, the focal length, and other photographing parameters may change. Thus, similar to the processing process above, if the photographing angle of the image collection device changes, as shown in FIG. 8, the virtual background image of the video interface is maintained unchanged, and the determination continues to be performed on the next video frame. In some other embodiments, during the video conference, the image collection device and the user may both move. Thus, the virtual background image may be maintained unchanged, and the processing may continue to be performed on the next video frame. For the implementation process, reference may be made to the corresponding description above, which is not repeated here.

Figure 9:
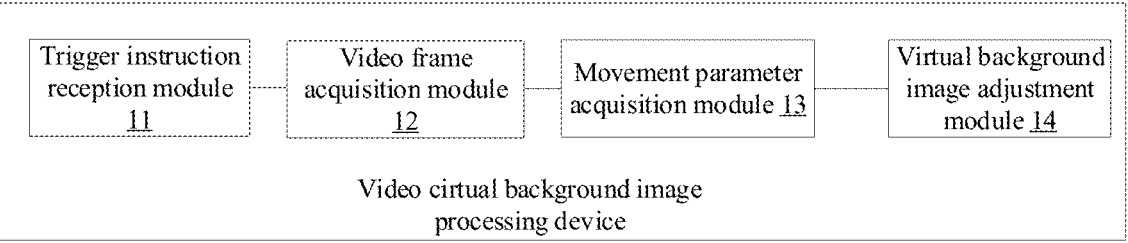
FIG. 9 illustrates a schematic structural diagram of a video virtual background image processing device according to embodiments of the present disclosure.

FIG. 9 illustrates a schematic structural diagram of a video virtual background image processing device according to embodiments of the present disclosure. The device includes a trigger instruction reception circuit 11, a video frame acquisition circuit 12, a movement parameter acquisition circuit 13, and a virtual background image adjustment circuit 14.

The trigger instruction reception circuit 11 may be configured to receive a trigger instruction.

The video frame acquisition circuit 12 may be configured to obtain the first video frame and the historical video frame neighboring to or apart at a certain number of frames from the first video frame.

The movement parameter acquisition circuit 13 may be configured to obtain the movement parameter of the front view object in the first video frame relative to the front view object in the historical video frame.

The virtual background image adjustment circuit 14 may be configured to adjust the virtual background image displayed by the video interface according to the movement parameter.

In some embodiments, the device may further include a photographing angle determination circuit. The photographing angle determination circuit may be configured to the first photographing angle of the first video frame is determined to be the same as the historical photographing angle of the historical video frame according to the first real background image of the first video frame and the second real background image of the historical video frame. Then, the movement parameter acquisition circuit 13 may be triggered to obtain the movement parameter of the front view object of the first video frame relative to the front view object of the historical video frame.

The first real background image may be an image obtained by removing the combined front view image from the real image of the first video frame. The second real background image may be an image obtained by removing the combined front view image from the real image of the second video frame. The combined front view image may be the combination of the image corresponding to the front view object in the first video frame and the image corresponding to the front view object in the historical video frame.

In some embodiments, the movement parameter may include a forward and backward movement parameter and/or a translation parameter. The forward and backward movement parameter may represent the relative change of the length or size of the first target reference of the front view object in the first video frame and the historical video frame. The translation parameter may be used to represent the relative change of the position of the second target reference on the front view object in the first video frame and in the historical video frame.

The virtual background image adjustment circuit 14 may include a scaling unit, a filling processing unit, and a translational adjustment unit.

The scaling unit may be configured to perform scaling on the virtual background image displayed in the video interface according to the movement parameter.

The filling processing unit may be configured to, in response to detecting that the display area of the zoomed-out virtual background image is smaller than the display area of the video interface, perform edge filling processing on the zoomed-out virtual background image.

The translational adjustment unit may be configured to perform a translational adjustment on the virtual background image displayed in the video interface according to the movement parameter.

In some other embodiments, the movement parameter may further include a rotation parameter. The rotation parameter may represent a relative change between the angle of the first target reference in the first video frame and the angle of the first target reference in the historical video frame. The rotation parameter can be used to correct the forward and backward movement parameter.

Based on the description above, the device may further include a display brightness adjustment circuit and/or a blurring processing circuit.

The display brightness adjustment circuit may be configured to adjust the display brightness of the front view object displayed in the video interface according to the forward and backward movement parameter.

The blurring processing circuit may be configured to perform blurring processing on the virtual background image displayed in the video interface according to the forward and backward movement parameter.

The circuits, units, etc. in device embodiments may be stored in the memory as program modules. The processor may be configured to execute the above program modules stored in the memory to realize corresponding functions. For the functions implemented by the program modules and a combination thereof and the achieved technical effects, reference may be made to the descriptions of method embodiments, which are not described in detail in embodiments of the present disclosure.

The present disclosure further provides a computer-readable storage medium, which may store a computer program that, when the computer program is called and loaded by the processor, causes the processor to implement the processes of the video virtual background image processing method described above.

Figure 10:
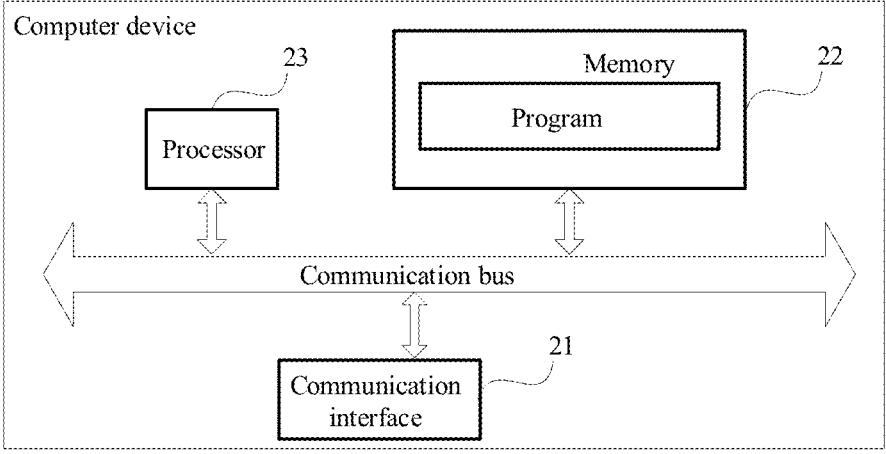
FIG. 10 illustrates a schematic structural diagram of a computer apparatus for a video virtual background image processing method according to embodiments of the present disclosure.

FIG. 10 illustrates a schematic structural diagram of a computer apparatus for a video virtual background image processing method according to embodiments of the present disclosure. The computer apparatus may be the terminal or server. As shown in FIG. 10, the computer apparatus may include a communication interface 21, a memory 22, and a processor 23.

A number of each of the communication interface 21, the memory 22, and the processor 23 may be at least one. The communication interface 21, the memory 22, and the processor 23 may communicate through a communication bus.

The communication interface 21 may be an interface of a wireless communication module and/or a wired communication module, such as a WIFI module, a 5G/6G (fifth generation mobile communication network/sixth generation mobile communication network) module, a GPRS module, a GSM module, etc., a USB interface, a serial/parallel interface, etc. The communication interface 21 may be configured to realize the data interaction between the internal components of the computer apparatus. In some embodiments, the communication interface of the computer apparatus can be configured according to specific network communication requirements. A type and a communication manner of the communication interface 21 may not be limited and may be determined as needed.

The memory 22 may store a program for implementing the video virtual background image processing method of embodiments of the present disclosure. The processor 23 may be configured to load and execute the program stored in the memory 22 to implement the processes of the video virtual background image processing method on a corresponding side of the computer apparatus in the present disclosure. For the implementation process, reference may be made to the description of method embodiments on the corresponding computer apparatus side, which is not described in detail here.

In embodiments of the present disclosure, the memory 22 may include a high-speed random access memory and a non-volatile memory, such as at least one magnetic disk storage device or another volatile solid-state storage device. The processor 23 may include a central processing unit (CPU), an application-specific integrated circuit (ASIC), a digital signal processor (DSP), a field programmable gate array (FPGA), or another programmable logic device, etc. The device types of the memory 22 and the processor 23 included in the computer apparatus may not be limited in the present disclosure and may be determined according to the corresponding functions of the computer apparatus.

Figure 11:
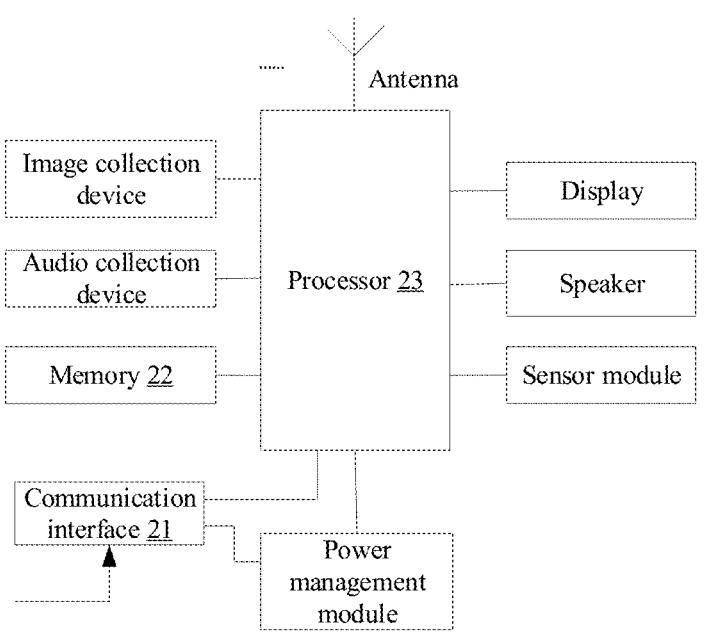
FIG. 11 illustrates a schematic structural diagram of another computer apparatus for a video virtual background image processing method according to embodiments of the present disclosure.

The structure of the computer apparatus of embodiments of the present disclosure is not limited to the structure of the device shown in FIG. 10. In practical applications, the computer apparatus may include more components or combinations of the components than the computer apparatus shown in FIG. 10. For example, when the computer apparatus is a terminal, referring to FIG. 11, the computer apparatus also includes at least one input device such as an image collection device (camera), an audio collection device (sound pickup), etc., at least an output device such as a display and a speaker, a sensor module composed of various sensors, a power management module, an antenna, a wireless/wired communication module, which are not listed in the present disclosure.

In embodiments of the present disclosure, unless the context clearly indicates otherwise, the words "a," "an," "one type," and/or "the" do not only refer to the singular, and may also include the plural. Generally speaking, the terms "comprising" and "including" only imply the processes and elements that are clearly identified. These processes and elements do not constitute an exclusive list. The method or device may also include other processes or elements. An element defined by the phrase "including a . . . " does not preclude the existence of an additional identical element in the process, method, article, or apparatus that includes the element.

In the description of embodiments of the present disclosure, unless otherwise specified, "/" means or, for example, AB may mean A or B. "and/or" in the specification is only used to represent an association relationship of associated objects, which may represent three types of relationships, for example, A alone, A and B, and B alone. In addition, in the description of embodiments of the present disclosure, "a plurality" may refer to two or more than two.

The terms such as "first," "second," etc., are only for description, used to differentiate an operation, a unit, or a module from another operation, another unit, or another module, and do not necessarily require or imply any such actual relationship or order between these units, operations, or modules. Moreover, these terms cannot be understood as indicating or implying relative importance or indicating the number of technical features indicated. Thus, the features defined with "first" and "second" may expressly or implicitly include one or more of these features.

In addition, the various embodiments in the specification are described in a progressive or parallel manner. Each embodiment focuses on the differences from other embodiments. The same and similar parts between the various embodiments may be referred to each other. Since the devices and the computer apparatus of embodiments in the present disclosure correspond to the methods of embodiments in the present disclosure, for the relevant parts, reference may be made to the descriptions of the methods.

The above description of embodiments of the present disclosure may enable those skilled in the art to make or use the present disclosure. Various modifications to embodiments of the present disclosure will be apparent to those skilled in the art. The generic principles defined herein may be implemented in other embodiments without departing from the spirit or scope of the present disclosure. Therefore, the present disclosure is not limited to the embodiments in the specification but conforms to the widest scope consistent with the principles and novel features disclosed here.

What is claimed is:

1. A video virtual background image processing method comprising:
receiving a trigger instruction;
obtaining a first video frame and a historical video frame neighboring to or apart at a certain number of frames from the first video frame;
obtaining a movement parameter of a front view object in the first video frame relative to the historical video frame, the movement parameter including a forward and backward movement parameter and/or a translation parameter, wherein:
the forward and backward movement parameter represents a relative change in a length or size of a first target reference of the front view object in the first video frame and the historical video frame; and
the translation parameter represents a relative change in a position of a second target reference of the front view object in the first video frame and the historical video frame; and
performing an adjustment on a virtual background image displayed in a video interface according to the movement parameter.

2. The method of claim 1, further comprising:
in response to determining that a first photographing angle of the first video frame to be same as a historical photographing angle of the historical video frame according to a first real background image of the first video frame and a second real background image of a historical video frame, obtaining the movement parameter.

3. The method of claim 2, wherein:
the first real background image is an image obtained by removing a combined front view image from a real image of the first video frame;
the second real background image is an image obtained by removing the combined front view image from a real image of a second video frame; and
the combined front view image is a combination of an image corresponding to the front view object in the first video frame and an image corresponding to the front view object in the historical video frame.

4. The method of claim 1, wherein:
the movement parameter further includes a rotation parameter, the rotation parameter representing a relative change in an angle of the first target reference in the first video frame and in the historical video frame; and
the rotation parameter is used to correct the forward and backward movement parameter.

5. The method of claim 1, further comprising:
adjusting a display brightness of the front view object displayed in the video interface according to the forward and backward movement parameter; and/or
performing blurring processing on the virtual background image displayed in the video interface according to the forward and backward movement parameter.

6. The method of claim 1, wherein performing the adjustment on the virtual background image displayed in the video interface according to the movement parameter includes:
performing scaling or translational adjustment on the virtual background image displayed in the video interface according to the moving parameter.

7. The method of claim 6, wherein performing the adjustment on the virtual background image displayed in the video interface according to the movement parameter includes:
in response to detecting that a display area of a zoomed-out virtual background image is smaller than a display area of the video interface, performing edge filling processing on the zoomed-out virtual background image.

8. A video virtual background image processing device comprising:
a memory storing a computer program; and
a processor coupled with the memory and, when the program is executed by the processor, configured to perform the method according to claim 1.

9. The device of claim 8, wherein the processor is further configured to:
in response to determining that a first photographing angle of the first video frame to be same as a historical photographing angle of the historical video frame according to a first real background image of the first video frame and a second real background image of a historical video frame, obtain the movement parameter.

10. The device of claim 9, wherein:
the first real background image is an image obtained by removing a combined front view image from a real image of the first video frame;
the second real background image is an image obtained by removing the combined front view image from a real image of a second video frame; and
the combined front view image is a combination of an image corresponding to the front view object in the first video frame and an image corresponding to the front view object in the historical video frame.

11. The device of claim 8, wherein:
the movement parameter further includes a rotation parameter, the rotation parameter representing a relative change in an angle of the first target reference in the first video frame and in the historical video frame; and
the rotation parameter is used to correct the forward and backward movement parameter.

12. The device of claim 8, wherein the processor is further configured to:
adjusting a display brightness of the front view object displayed in the video interface according to the forward and backward movement parameter; and/or
performing blurring processing on the virtual background image displayed in the video interface according to the forward and backward movement parameter.

13. The device of claim 8, wherein the processor is further configured to:
perform scaling or translational adjustment on the virtual background image displayed in the video interface according to the moving parameter.

14. The device of claim 13, wherein the processor is further configured to:

in response to detecting that a display area of a zoomed-out virtual background image is smaller than a display area of the video interface, perform edge filling processing on the zoomed-out virtual background image.

15. A non-transitory computer-readable storage medium storing a computer program that, when executed by a processor, causes the processor to perform the method according to claim 1.

16. The storage medium of claim 15, wherein the processor is further configured to:

in response to determining that a first photographing angle of the first video frame to be same as a historical photographing angle of the historical video frame according to a first real background image of the first video frame and a second real background image of a historical video frame, obtain the movement parameter.

17. A video virtual background image processing method comprising:

receiving a trigger instruction;

obtaining a first video frame and a historical video frame neighboring to or apart at a certain number of frames from the first video frame;

obtaining a movement parameter of a front view object in the first video frame relative to the historical video frame; and performing an adjustment on a virtual background image displayed in a video interface according to the movement parameter, including performing scaling or translational adjustment on the virtual background image displayed in the video interface according to the moving parameter adjustment.

* * * * *